UNITED STATES PATENT OFFICE.

EUGENE BONSTEIN, OF SHICKSHINNY, PENNSYLVANIA.

PROCESS FOR MAKING FUEL-BRIQUETS.

965,069.  Specification of Letters Patent.  Patented July 19, 1910.

No Drawing.  Application filed February 17, 1910. Serial No. 544,406.

*To all whom it may concern:*

Be it known that I, EUGENE BONSTEIN, a citizen of the United States, and a resident of Shickshinny, in the county of Luzerne and State of Pennsylvania, have made certain new and useful Improvements in Processes for Making Fuel-Briquets, of which the following is a specification.

My invention relates to a process for the manufacture of fuel briquets, and it consists in the several steps hereinafter described.

An object of my invention is to manufacture a briquet which shall burn freely and give out good heat, but which shall be practically smokeless. The briquets in common use generally consist of some form of coal dust held together by means of a binder, the principal ingredient of which is pitch. These briquets have one serious objection, namely, that they give out an intense black smoke which clogs the flues and tends to decrease the heat giving properties. In the present invention the binding material holds the fuel together but burns with very little smoke and very little ash.

A further object of my invention is to manufacture a briquet which will resist the weather when exposed to rain, snow, etc., and which will not disintegrate under these conditions.

Other objects and advantages will appear in the following specification and the novel features of the compound will be particularly pointed out in the appended claim.

The invention is designed primarily for use with anthracite coal dust.

In carrying out the invention I make use of the coal dust which is ordinarily wasted as it comes from the washers. This coal dust I form into briquets by the use of a novel binder which is made in the following manner. Rye grain is ground very fine, the whole grain being used, and is then made into a smooth batter with water at normal temperature. The batter thus made is formed into a paste by adding boiling water. The second ingredient of the binder consists of digested vegetable matter. This may be cattle dung or it may be prepared by means of chemicals. Various vegetable matters may be used, such as corn stalks, weeds, etc. The method of digesting this vegetable matter may be by any suitable process, such as by the use of soda ash, lime and steam, and forms no part of the invention. The amount of the ingredients for digesting the vegetable matter varies, of course, according to the article to be treated. After the vegetable matter has been digested sufficient hot water is added to make a syrup-like mass. The rye grain paste and the digested vegetable matter is then mixed together, the mixture being thoroughly stirred. The relative amounts of the rye and vegetable matter varies according to the size of the particles of the coal dust to be treated. In practice, however, I find that from 1 to 1½% of the grain and 2 to 5% of the vegetable matter may be used for every ton of the coal dust. The mixture is then heated and is brought just to the boiling temperature to effect the completion of the binding substance. The binder thus prepared is now mixed with the coal dust in mixing machines and then is compressed in a briquet machine in molds. The briquets are placed in ovens as they come from the molds and are thoroughly dried, care being taken not to have the temperature too high so as not to drive off any of the volatile constituents of the coal. The briquets thus formed are then ready for the final treatment which renders the product water-proof. This is accomplished by treating the briquets with crude petroleum which may be sprayed or poured over the briquets so as to coat them thoroughly with the water resisting compound. In place of petroleum other water resisting hydocarbons might be used. The addition of the petroleum serves not only to render the products water-proof but also adds to the fuel properties of the product.

Briquets prepared in the manner thus described are practically smokeless, while the heat derived from their combustion is almost that of anthracite coal of the same weight. The briquets will stand handling and transportation and will not disintegrate when exposed to the weather. The binding material does not add materially to the ash and the briquets will burn freely, leaving a fine ash with entire absence of clinkers.

I claim:

The herein described process for forming briquets which consists in preparing a paste from rye grain, digesting vegetable matter, diluting the digested vegetable matter to make a syrup-like mass, mixing the paste and the syrup, heating the mixture to form the completed binder, treating the coal dust with the binder, compressing the material thus treated for forming a briquet, drying and subsequently treating the briquet with a hydro-carbon water-proofing compound.

EUGENE BONSTEIN.

Witnesses:
L. A. STANLEY,
SOLON C. KEMON.